United States Patent [19]
Yamamoto et al.

[11] Patent Number: 5,260,412
[45] Date of Patent: * Nov. 9, 1993

[54] TERMINAL-MODIFIED IMIDE OLIGOMER COMPOSITION

[75] Inventors: Shinji Yamamoto; Hideho Tanaka; Kazuyoshi Fujii, all of Hirakata, Japan

[73] Assignee: Ube Industries, Ltd., Yamaguchi, Japan

[*] Notice: The portion of the term of this patent subsequent to Jul. 7, 2009 has been disclaimed.

[21] Appl. No.: 586,460

[22] Filed: Sep. 24, 1990

[30] Foreign Application Priority Data

Sep. 26, 1989 [JP] Japan .................. 1-247951
Apr. 13, 1990 [JP] Japan .................. 2-96564

[51] Int. Cl.⁵ .................. C08G 69/26; C08G 73/10; C08G 2/00; C08L 79/08
[52] U.S. Cl. .................. 528/353; 528/125; 528/126; 528/128; 528/179; 528/185; 528/188; 528/222; 528/224; 528/229; 528/322; 528/342; 528/351; 528/352
[58] Field of Search .............. 528/353, 352, 351, 125, 528/126, 128, 179, 185, 188, 222, 224, 229, 322, 342

[56] References Cited

U.S. PATENT DOCUMENTS

| | | | |
|---|---|---|---|
| 4,251,417 | 2/1981 | Chow et al. | 528/352 |
| 4,251,418 | 2/1981 | Chow et al. | 528/352 |
| 4,299,750 | 11/1981 | Antonoplos et al. | 528/352 |
| 4,869,861 | 9/1989 | Inoue et al. | 264/204 |
| 4,963,645 | 10/1990 | Inoue et al. | 528/342 |
| 5,128,444 | 7/1992 | Inoue et al. | 528/353 |

FOREIGN PATENT DOCUMENTS

| | | |
|---|---|---|
| 0304913 | 3/1989 | European Pat. Off. . |
| 357367 | 3/1990 | European Pat. Off. . |
| 59-167569 | 9/1984 | Japan . |
| 60-250030 | 12/1985 | Japan . |
| 60-260624 | 12/1985 | Japan . |

*Primary Examiner*—John Kight, III
*Assistant Examiner*—P. Hampton-Hightower
*Attorney, Agent, or Firm*—Finnegan, Henderson, Farabow, Garrett & Dunner

[57] ABSTRACT

A terminal-modified imide oligomer composition, comprising
(A) 100 parts by weight of a terminal-modified imide oligomer obtained by a reaction in a solvent of a biphenyltetracarboxylic acid compound with an aromatic diamine compound and a monoamine compound containing a carbon-carbon triple bond, and having an unsaturated terminal group at the terminal of the oligomer and an imide bond in the oligomer, and having a logarithmic viscosity number at 30° C., as determined at a concentration of 0.5 g/100 ml of N-methyl-2-pyrrolidone as a solvent, of from 0.1 to 1 and;
(B) 5 to 180 parts by weight of an unsaturated imide compound obtained by a reaction in a solvent of a substituent-containing nadic anhydride with a monoamine compound having a carbon-carbon triple bond in an equimolar ratio, and having an unsaturated terminal group at the terminal thereof and an imide bond therein.

10 Claims, No Drawings

TERMINAL-MODIFIED IMIDE OLIGOMER COMPOSITION

BACKGROUND OF THE INVENTION

1. Field of the Invention

The present invention relates to a terminal-modified imide oligomer composition comprising, in a specific ratio, (a) a specific terminal-modified imide oligomer (A) produced by reacting a biphenyltetracarboxylic acid compound with a diamine compound and a monoamine compound having a terminal carbon-carbon triple bond and having an imide bond in the molecular unit thereof, and (b) a low molecular weight unsaturated imide compound (B) obtained by a binary reaction of a substituent-containing nadic anhydride with a monoamine compound containing a terminal carbon-carbon triple bond and having an imide bond in the molecular unit thereof.

The terminal-modified imide oligomer composition of the present invention allows a reduction in the time required for thermal curing during the molding of a composite material, for example, and at the same time, permits an easy production of a prepreg having a used organic solvent substantially extracted therefrom, and can be advantageously used, as a matrix resin in the production of composite materials, as a resin for other molding compounds, and as a hot-melt type adhesive.

Particularly, a laminated composite material produced by thermally curing stacked layers of a fiber-reinforced imide oligomer matrix prepreg using, as a matrix resin thereof, the terminal-modified imide oligomer composition of the present invention, has a high mechanical strength, elastic modulus, and heat resistance, and therefore, can be used extensively in aircraft, machines and vessels for the space industry, printed-wiring boards, and machines and vessels in the electronics field, for example.

2 Description of the Related Art

The polyimide resin has long been used as a matrix resin for shaped articles and fiber-reinforced composite materials, due to its outstanding heat resistance.

Recently, unsaturated terminal group-containing addition type polyimide resins obtained by the reaction of (a) an aromatic tetracarboxylic dianhydride such as pyromellitic dianhydride or benzophenonetetracarboxylic dianhydride with (b) an aromatic diamine and (c) an unsaturated type reactive compound, have been proposed as resins for preimpregnation (see, for example, Japanese Unexamined Patent Publication (Kokai) Nos. 59-167,569, 60-250,030, and 60-260,624). Most of the known polyimide resins of this class, however, have posed numerous problems due to a low solubility thereof in organic solvents, difficulties involved in impregnating same with reinforcing fibers, and the high melting points thereof.

Recently, the present inventors filed an application for inventions related to biphenyltetracarboxylic acid type terminal-modified imide oligomers having a satisfactory solubility (see, for example, Japanese Unexamined Patent Publication (Kokai) No. 1-139,632, Japanese Patent Application No. 63-73,194). When used as matrix resins for preimpregnation, however, the terminal-modified imide oligomers of these inventions are not fully satisfactory because of problems such as an unduly long gelling time, the likelihood of a persistence of an uncross-linked terminal group even after thermal curing, and a low strength of the cured product.

The present inventors, as a solution to the problems mentioned above, then proposed an imide oligomer composition which combines a high molecular weight unsaturated imide oligomer and a low molecular weight unsaturated imide compound having a terminal carbon-carbon triple bond, and filed this invention as Japanese Patent Application No. 63-213,732 (see EP-A-357367).

The above-mentioned composition requires the incorporation therein of an organic solvent, because the components thereof are in a solid state at normal room temperature, and therefore, when used as a matrix resin for preimpregnation, voids are apt to appear during the thermal curing of the prepreg, and a disadvantage arises in that a laminate composite material obtained by thermally curing stacked layers of the prepreg exhibits inferior physical constants. Further, the above-mentioned known compositions are such that, when the prepregs formed of the compositions are stored, the stability thereof is low because the solvents incorporated therein are vaporized and diffused in the air.

SUMMARY OF THE INVENTION

Accordingly, the objects of the present invention are to eliminate the above-mentioned problems of the prior art and to provide an "aromatic tetracarboxylic acid-based addition polymerization type imide oligomer composition" which solves the various problems inherent in the prior art mentioned above, shortens the time required for the curing of a prepreg, allows the production of a stable prepreg an imide oligomer matrix prepreg having a particularly excellent tackiness, all of a used organic solvent being substantially extracted therefrom, and consequently, permits the manufacture of a laminate composite material having a high mechanical strength and a high heat resistance by a procedure which comprises preparing such prepregs, stacking same, and thermally curing the stacked layers.

Other objects and advantages of the present invention will be apparent from the following description.

In accordance with the present invention, there is provided a terminal-modified imide oligomer composition comprising;

(A) 100 parts by weight of a terminal-modified imide oligomer produced by reacting, in a solvent, a biphenyltetracarboxylic acid compound with an aromatic diamine compound and a monoamine compound having a carbon-carbon triple bond and having (i) an unsaturated terminal group at the terminal of the oligomer, (ii) an imide bond in the oligomer, and (iii) a logarithmic viscosity number at 30° C., as determined at a concentration of 0.5 g/100 ml of N-methyl-2-pyrrolidone as a solvent, of 0.1 to 1 and;

(B) 5 to 180 parts by weight of an unsaturated imide compound produced by reacting, in a solvent, a substituent-containing nadic anhydride with a monoamine compound having a carbon-carbon triple bond in an equimolar ratio and having an unsaturated terminal group at the terminal thereof and an imide bond therein.

The term "a biphenyltetracarboxylic acid compound" used herein means biphenyltetracarboxylic acids, the anhydrides thereof, the alcohol esters thereof, the salts thereof, and other similar derivatives thereof.

DESCRIPTION OF THE PREFERRED EMBODIMENTS

The terminal-modified imide oligomer (A) usable in the present invention need be only an imide oligomer obtained by a reaction, in an organic solvent, of a biphenyltetracarboxylic acid compound, an aromatic diamine compound, and a monoamine compound having a carbon-carbon triple bond used in respective amounts such that the total of equivalent weights of the acid anhydride groups (or, for example, two adjacent carboxyl groups) of the components and the total of equivalent weights of the amino groups of the components are substantially equal. The terminal-modified imide oligomer (A) mentioned above is a terminal-modified imide oligomer having an addition polymerizable triple bond-containing unsaturated terminal group such as a propargyl group at the terminal of the imide oligomer and at least one imide bond, preferably a plurality of imide bonds, within (in the main chain of) the imide oligomer.

The terminal-modified imide oligomer (A) is preferably a terminal-modified imide oligomer which has a logarithmic viscosity number, as determined at a concentration of 0.5 g/100 ml of N-methyl-2-pyrrolidone as a solvent, of preferably from 0.1 to 1, more preferably 0.2 to 0.8, and most preferably 0.3 to 0.7, i.e., has a relatively high molecular weight and has a softening point of from 100° C. to 300° C., preferably from 150° C. to 270° C., is soluble in organic solvents, and become a solid (powder) at room temperature.

Examples of the biphenyltetracarboxylic acid compounds effectively usable herein include 3,3',4,4'-biphenyltetracarboxylic acid, 3,3',4,4'-biphenyltetracarboxylic dianhydride (s-BPDA), or lower alcohol esters, salts, and other similar acid derivatives of such acid compounds, 2,3,3',4'-biphenyltetracarboxylic acid, 2,3,3',4'-biphenyltetracarboxylic dianhydride (a-BPDA), or lower alcohol esters, salts, and other similar acid derivatives of such acid compounds. Among the above-mentioned biphenyltetracarboxylic acids, 3,3',4,4'- and 2,3,3',4'-biphenyltetracarboxylic dianhydrides are most preferable.

The above-mentioned 3,3',4,4'- or 2,3,3',4'-biphenyltetracarboxylic acid compounds may have a part thereof (for example, not more than 30 mol %, preferably not more than 20 mol %, and more preferably not more than 10 mol %) substituted with any of the other aromatic tetracarboxylic acids such as 3,3',4,4'-benzophenone tetracarboxylic dianhydride, pyromellitic dianhydride, 2,2-bis(3',4'-dicarboxyphenyl)propane dianhydride, bis(3,4-dicarboxyphenyl)methane dianhydride, and bis(3,4-dicarboxyphenyl)ether dianhydride or with any of the aliphatic tetracarboxylic acids such as butane tetracarboxylic dianhydride.

Examples of the diamine compound mentioned above are the following aromatic diamine compounds:

(A) Diamine Compounds Having One Aromatic Ring i) Phenylene diamine type diamine compounds
 ii) Xylylene type diamine compounds
 iii) Trialkylbenzene type diamine compounds (B) Diamine Compounds Having Two Aromatic Rings i) Benzidine type diamine compounds
 ii) Diphenyl ether type diamine compounds
 iii) Diphenyl thioether type diamine compounds
 iv) Benzophenone type diamine compounds
 v) Diphenyl sulfine type diamine compounds
 vi) Diphenyl sulfide type diamine compounds
 vii) Diphenyl sulfone type diamine compounds
 viii) Diphenyl alkane type diamine compounds (C) Diamine Compounds Having Three Aromatic Rings i) Bis(phenoxy)benzene type diamine compounds (D) Diamine Compounds Having Four Aromatic Rings i) Bis[(phenoxy)phenyl]propane type diamine compounds
 ii) Bis(phenoxy)diphenyl sulfone type diamine compounds These aromatic diamine compounds may be used either alone or in any mixture thereof.

The aromatic diamines advantageously usable herein include diphenyl ester type diamine compounds such as 4,4'-diaminodiphenyl ether (DADE), 3,3'-diaminodiphenyl ether, and 3,4'-diaminodiphenyl ethers; diphenyl alkane type diamine compounds such as 3,3'-diaminodiphenyl methane, 4,4'-diaminodiphenyl methane, bis(2-ethyl-6-methyl-4-aminophenyl) methane, 2,2-bis(3-aminophenyl) propane, and 2,2-bis(4-aminophenyl) propane; bis(phenoxy) benzene type diamine compounds such as 1,3-bis(4-aminophenoxy) benzene (TYPE-R), 1,3-bis(3-aminophenoxy) benzene, 1,4-bis(4-aminophenoxy)benzene (TPE-Q), and 1,4-bis(3-(aminophenoxy) benzene; bis[4-(phenoxy)phenyl] propane type diamine compounds such as 2,2-bis[4-(4-aminophenoxy)phenyl] propane and 2,2-bis[4-(4-aminophenoxy)phenyl] hexafluoropropane; bis(phenoxy) diphenyl sulfones type diamine compounds such as 4,4'-bis(4-aminophenoxy)diphenyl sulfone, bis[4-(4-aminophenoxy)phenyl] sulfone, and bis[4-(3-aminophenoxy)phenyl] sulfone; and diphenyl sulfone type diamine compounds such as 3,3'-diaminodiphenyl sulfone and 4,4'-diaminodiphenyl sulfone.

The above-mentioned monoamine compounds having a carbon-carbon triple bond are reactive unsaturated monoamine compounds having both an unsaturated group (i.e., cross-linking group) composed of a carbon-carbon triple bond (i.e., acetylene group) and a monoamino group (i.e., primary amino group), and capable of forming an imide bond by a reaction with a pair of adjacent carboxyl groups.

The monoamine compounds having a carbon-carbon triple bond, advantageously usable herein, include (a) aliphatic monoamino compounds such as propargyl amine (PA), 3-aminobutyne, 4-aminobutyne, 5-aminopentyne, 6-aminohexyne, 7-aminoheptyne, 4-amino-3-methylbutyne, and 4-aminopentyne and (b) aromatic monoamino compounds such as 3-aminophenyl acetylene and 4-aminophenyl acetylene. In the present invention, the above-mentioned monoamine compounds having a carbon-carbon triple bond may be used alone or in any mixture thereof.

The organic solvents effectively usable in the production of the above-mentioned terminal-modified imide oligomer (A) include amide type solvents such as N,N-dimethyl formamide, N,N-dimethyl acetamide, N-methyl-2-pyrrolidone (NMP), and N-methyl caprolactam, sulfur containing solvents such as dimethyl sulfoxide, hexamethyl phosphoramide, dimethyl sulfone, tetramethylene sulfone, and dimethyltetramethylene sulfone, phenol type solvents such as cresol and phenol, and other solvents such as pyridine, ethylene glycol, and tetramethyl urea.

The terminal-modified imide oligomer (A) usable in the present invention can be produced, for example, by using 2,3,3',4'-biphenyltetracarboxylic acids (particularly the dianhydride thereof), an aromatic diamine compound, and a monoamine compound having a carbon-carbon triple bond, in respective amounts such that the total of equivalent weights of the acid anhydride group (or adjacent dicarboxylic acid groups) of all of the components and the total of equivalent weights of the amino groups of all of the components are substantially equal, allowing all of the components to react in an organic polar solvent at a temperature of about 100° C. or less, preferably 80° C. or less, for a period of approximately from 1 to 120 minutes, to thereby form an "amide-acid bond-containing oligomer", then effecting a dehydration and imide cyclization of the amic acid oligomer by either adding thereto an imidizing agent at a low temperature of approximately from 0° C. to 140° C. or heating at a high temperature of from 140° C. to 250° C. (preferably 150° C. to 200° C.) for a period of from 5 to 180 minutes, to thereby form an imide oligomer having an addition polymerizable unsaturated group at the terminal thereof, and finally cooling the resultant reaction solution to about room temperature.

Optionally, this reaction solution may be subjected, either in the unmodified form or in a suitably concentrated or diluted form, to the synthesis of an unsaturated imide compound (B) to be specifically described hereinafter.

The unsaturated imide compound (B) to be used in the present invention need be only an unsaturated imide compound obtained by a reaction in an organic solvent of a substituent-containing nadic anhydride with a monoamine compound having a carbon-carbon triple bond in a substantially equimolar ratio.

The above-mentioned unsaturated imide compound (B) is an unsaturated imide compound having an unsaturated terminal group containing an addition polymerizable triple bond such as a propargyl group at the terminal thereof, and an imide bond inside the compound.

The above-mentioned unsaturated imide compound (B) is preferably having a logarithmic viscosity number at 30° C., as determined at a concentration of 0.5 g/100 ml of N-methyl-2-pyrrolidone as a solvent, of approximately from 0.005 to 0.09, preferably 0.01 to 0.08, more preferably 0.01 to 0.05, i.e., a relatively low molecular weight, and is soluble in organic solvents and a liquid at room temperature.

The "monoamine compound having a carbon-carbon triple bond" and the "organic solvent for the reaction" usable in the production of the above-mentioned unsaturated imide compound (B) may be the same as the "monoamine compound having a carbon-carbon triple bond" and the "organic solvent for the reaction" already specifically illustrated above with respect to the production of the terminal-modified imide oligomer (A).

The above-mentioned substituent-containing nadic anhydride is preferably a nadic anhydride having a substituent such as a lower alkyl group of 1 to 6 carbon atoms, an alkoxy group of 1 to 6 carbon atoms, a halogenated hydrocarbon group of 1 to 6 carbon atoms, and 1 to 5 halogen atoms (e.g., F, Cl, Br), or a halogen group (e.g., F, Cl, Br) positioned at the 5- or 6-position. The substituent-containing nadic anhydrides advantageously usable herein include alkyl group-containing nadic anhydrides such as methyl-5-norbornene-2,3-dicarboxylic anhydride and ethyl-5-norbornene-2,3-dicarboxylic anhydride, alkoxy group-containing nadic anhydrides such as methoxy-5-norbornene-2,3-dicarboxylic anhydride and ethoxy-5-norbornene-2,3-dicarboxylic anhydride, halogenated hydrocarbon group-containing nadic anhydrides such as trifluoromethyl-5-norbornene-2,3-dicarboxylic anhydride, and halogen group-containing nadic anhydrides such as fluoro-5-norbornene-2,3-dicarboxylic anhydride and chloro-5-norbornene-2,3-dicarboxylic anhydride.

The reaction method and reaction conditions used in the production of the unsaturated imide compound (B) are preferably substantially the same as those used in the production of the terminal-modified imide oligomer (A) described above.

The terminal-modified imide oligomer composition of the present invention has a homogeneous mix therein of 100 parts by weight of the terminal-modified imide oligomer (A) and 5 to 180 parts by weight, preferably 6 to 160 parts by weight, more preferably 6 to 150 parts by weight, of the unsaturated imide compound (B), both produced as described above.

In the composition of the present invention, when the content ratio of the unsaturated imide compound (B) to the terminal-modified imide oligomer (A) is too large, a disadvantage arises in that numerous voids and blisters are formed on the surface of the cured product of the composition and the mechanical properties are greatly lowered. Conversely, when the content ratio of the unsaturated imide compound (B) is too small, the composition is unusable because the curing of the composition is slow, the handling is difficult, the prepreg formed of the composition exhibits a poor tackiness, and the physical properties (particularly Tg, for example), of the cured product are poor.

The terminal-modified imide oligomer composition of the present invention is a mixture having a powder of the terminal-modified imide oligomer (A) and a liquid of the unsaturated imide compound (B) mixed at least homogeneously therein. Optionally, this is an uncured mixture (e.g., molding compound or adhesive) having a reinforcing material, a filler, and a small amount of a thermosetting resin or thermoplastic resin incorporated in the above-mentioned mixture. A terminal-modified imide oligomer solution prepared by homogeneously dissolving the terminal-modified imide oligomer (A) and the unsaturated imide compound (B) in an organic solvent is within the technical scope of the present invention.

The above-mentioned terminal-modified imide oligomer solution allows the manufacture of an uncured prepreg containing reinforcing fibers by a procedure which comprises impregnating the reinforcing fibers with the solution, and heating and drying the impregnated reinforcing fibers, to thereby extract the organic solvent therefrom.

Among the methods available for the production of a prepreg, using of the terminal-modified imide oligomer composition of the present invention, the hot-melt method (i.e., solvent-less drying method), which comprises heating the terminal-modified imide oligomer composition to an elevated temperature and impregnating the reinforcing fibers with the molten composition, is preferable. Alternatively, a solution method (i.e., wet method), which comprises preparing a solution composition by the addition of an organic solvent to the terminal-modified imide oligomer composition, impregnating the reinforcing fibers with this solution composition, and then heating and drying the impregnated reinforcing fibers to thereby extract the solvent therefrom, may be employed for the production.

The reinforcing fibers or reinforcing materials effectively usable herein include glass fibers, PAN type carbon fibers, pitch type carbon fibers, aromatic polyamide fibers, alumina fibers, silicon carbide fibers, and Si-Ti-C-O type fibers (produced by Ube Industries, Ltd. and marketed under the trademark of 37 Tyranno" fiber), and mixtures of two or more such fibers. The above-mentioned reinforcing fibers may have undergone a surface treatment or a sizing treatment known to the art, and although the above-mentioned fibers are preferably used in the form of filament yarns, they may be used in the form of a woven fabric.

The fillers effectively usable herein include oxides such as silicates, non-oxides such as silicon nitride and silicon carbide, and powdery substances such as graphite and Teflon. The thermoplastic resins effectively usable herein include resins such as PEEK, PES, PPS, PSF, PEI, and thermoplastic polyimides, which have a very high heat resistance.

The terminal-modified imide oligomer composition of the present invention can be used for the formation of a prepreg even in the absence of a solvent. The prepreg produced from this composition has a thickness of approximately from 10 to 300 μm, preferably 50 to 200 μm. The volatile matter in the prepreg should be included in an amount of not more than 1% by weight, preferably not more than 0.5% by weight, based on the total amount of the prepreg.

In the above-mentioned prepreg, the proportion of the imide oligomer content, which is 100 times the value calculated by the formula, Wr/(Wr+Wf), wherein Wr and Wf, respectively, represent the weights of the modified imide oligomer composition and the reinforcing fibers present in the prepreg, is preferably from 20% to 50% by weight, more preferably 25% to 45% by weight.

For the production of a molded article by using the terminal-modified imide oligomer composition of the present invention, any of the known methods, for example, press molding, transfer molding, and injection molding, can be employed.

For the production of a composite material from prepregs formed by using the terminal-modified imide oligomer composition of the present invention, a fiber-reinforced polyimide composite material having the terminal-modified imide oligomer composition incorporated therein in a cured state is obtained by a procedure which comprises, preparing prepregs having reinforcing fibers impregnated with the terminal-modified imide oligomer composition, stacking the prepregs by any known method, for example, vacuum/autoclave curing, hotpress molding, and sheet winding, and thermally molding the resultant laminate under a pressure of approximately from 3 to 15 kg/cm² at a temperature of from 200° to 300° C.. The composite material thus obtained may be subjected to postcuring as required.

The above-mentioned ply stacking is preferably carried out at an elevated temperature of from 30° to 150° C., more preferably 60° to 100° C..

When the ply stacking is performed in this temperature range, the produced prepregs exhibit an advantageous tackiness and drapability, and a highly satisfactory workability.

In the laminate composite material having a matrix of the fiber-reinforced polyimide resin mentioned above, the volumetric content of fibers is preferably approximately from 30% to 80% by volume, more preferably 40% to 70% by volume. Further, for the laminate composite material produced by using the composition of the present invention to exhibit a satisfactory strength, the volumetric ratio of voids must be very low and must be 0.5% by volume or less.

The composite material molded by the method of the present invention exhibits an excellent heat resistance because the cured terminal-modified imide oligomer composition undergoes a thermal decomposition at temperatures 400° C. or more and possesses a secondary transition point (Tg) of 250° C. or more, and further, has a high mechanical strength because it is reinforced with fibers.

The terminal-modified imide oligomer composition of the present invention is usable not only for the production of fiber-reinforced composite materials as described above, but also as a heat-resistant adhesive agent for joining polyimide films and metallic foils, for example, and as a resinous matrix for various molding compounds.

The terminal-modified imide oligomer composition of the present invention comprises a terminal-modified imide oligomer (A) (powder) having a relatively large molecular weight and an unsaturated imide compound (B) (liquid) having a relatively small molecular weight. The terminal-modified imide oligomer (A) enables a cured product of the composition to basically acquire high mechanical properties, and at the same time, the unsaturated imide compound (B) imparts to the composition an ability to shorten the curing time (gel time) thereof. The terminal-modified imide oligomer (A) and the unsaturated imide compound (B) used in the composition of the present invention show a high compatibility with each other and a satisfactory solubility in organic solvents. In the production of a prepreg, although such an organic solvent is lost from the prepreg by vaporization, the unsaturated imide compound is retained intact therein. The produced prepreg, although containing substantially no organic solvent, exhibits a satisfactory tackiness, and as a result, a composite material having excellent physical properties can be easily produced.

EXAMPLES

The present invention will now be further illustrated by, but is by no means limited to, the following Examples. The various physical properties mentioned in the Examples and the Comparative Experiments were determined by the following methods.

(a) Logarithmic Viscosity Number (ηinh)

The logarithmic viscosity number (ηinh) of a terminal-modified imide oligomer (A) or an unsaturated imide compound (B) was determined by homogeneously dissolving a sample imide oligomer (A) or a sample imide compound (B) in a concentration of 0.5% by weight in N-methyl-2-pyrrolidone (NMP), to thereby prepare a polymer solution, measuring the viscosity of the polymer solution and that of the solvent alone at 30° C., and calculating the following formula using the results of the measurement.

$$\eta_{inh} = \frac{\ln(\text{solution viscosity/solvent viscosity})}{\text{Concentration of solution}}$$

(b) Curing Time (Gel Time) of Composition (Prepreg

The gel time was determined, at 250° C., by preparing a prepreg from a given composition in accordance with the specification of JIS (Japanese Industrial Standard) K7071, pressing the prepreg to thereby extract the resin from the prepreg, and heating the resin to thereby determine a change in the stringy property of the hot resin due to the temperature.

(c) Tackiness of Prepreg (Test Method A)

The tackiness of a given prepreg was determined by horizontally placing an iron sheet (10.2 cm in width and 20.3 cm in length) with the surface temperature thereof set at 70° C., applying a given prepreg (7.6 cm in width and 7.6 cm in length) to the iron sheet, further applying another prepreg to the first prepreg, and allowing the prepregs stacked on the iron sheet to stand upright while fixed to the iron sheet, for 30 minutes, to thereby determine whether or not the stacked prepregs are peeled off, according to a procedure of AMS 3849.

(d) Tackiness of Prepreg (Test Method B)

The tackiness of given prepregs was determined by applying to the upper surface of a prepreg, 6 cm in width and 9 cm in length and preheated to 100° C., another prepreg 1.6 cm in width and 5 cm in length and preheated similarly to 100° C., under the application of pressure and at a speed of 40 mm/min, with the directions of the fibers thereof coinciding, holding the joined prepregs under a load of 2.2 kg for 30 seconds, and separating the two prepregs from each other at a speed of 10 mm/min, to thereby determine the maximum separation stress (g/cm$^2$). The maximum stress thus determined is taken as the degree of tackiness indicating the tackiness.

(e) Volatile Matter Content in Prepreg ($V_c$)

The volatile matter content of a given prepreg was determined by cutting a 10 cm square from a given prepreg, taking the weight, $W_1$, of the square, heating the prepreg square in a vacuum oven at 90° C. for 4 hours, taking the weight, $W_2$, of the cured square, and calculating the volatile matter ($V_c$) by the formula, $(W_1-W_2)\times 100/W_1$ according to a procedure of AMS 3847A.

(f) Resin Content in Prepreg ($W_1$)

The resin content in a given prepreg was determined by cutting a 10 cm square from the prepreg, taking the weight, A, of the square, extracting the resin component from the prepreg square with dimethyl formamide, taking the dry weight, C, of the residue of extraction, and calculating $W_r$ by using the following formula including the value $V_c$ found in (e) above, according to a procedure of ASTM C613.

$$W_r = 100\left[1 - \frac{C}{A(1 - V_c/100)}\right]$$

(g) Glass Transition Temperature of Composite Material (Tg)

The glass transition temperature, Tg, of a given composite material was determined by preparing a sample 4-ply 0°-direction laminate sheet (1 cm in width and 5.5 cm in length), testing the dynamic viscoelasticity of the bending mode (frequency 1 Hz and strain 0.02%) of this sample laminate sheet (with a tester produced by Rheometrics Corp. and marketed under the trademark "RDS II"), and determining the peak temperature of the loss modulus (E").

(h) Mechanical Properties (Flexural Strength, Flexural Modulus, and Interlaminar Shear Strength) of Composite Material

| Testing device: | Instron 1185 |
| Testing temperature: | 23° C. |
| Testing humidity: | 50% RH | i) 0° flexural strength—ASTM D790 ii) 0° flexural modulus—ASTM D790 (three-point bending method; span/thickness ratio 32)

iii) Interlaminar shear strength—ASTM D2344 (short beam method; span-thickness ratio 4).

(i) Volumetric Fiber Content (Vol %)

The volumetric fiber content of a given composite material was determined by dissolving the resinous matrix of a given composite material in concentrated sulfuric acid, finding the gravimetric content of reinforcing fibers, and performing the necessary calculation using the gravimetric content of the reinforcing fibers and the density of the composite material found in advance, according to a procedure of ASTM D3171.

EXAMPLE 1 i) Production of Terminal-Modified Imide Oligomer (A)

In a 500 ml flask, (a) 105.92 g of 2,3,3',4'-biphenyltetracarboxylic dianhydride (a-BPDA), (b) 87.70 g of 1,3-bis(4-aminophenoxy)benzene (TPE-R), (C) 6.67 g of propargyl amine (PA), and (d) 240 g of N-methyl-2-pyrrolidone (NMP) were charged and stirred under a nitrogen gas stream at 50° C. for one hour, to produce an amic acid oligomer, and the resultant reaction solution was then heated to 185° C. and stirred at the same temperature for one hour to form a terminal-modified imide oligomer.

The resultant reaction solution was cooled to room temperature (about 25° C.) and then poured into water to precipitate a powdery imide oligomer. The precipitated imide oligomer was separated by filtration, washed twice with methanol at 25° C., and dried under a vacuum, to yield a terminal-modified imide oligomer powder having a logarithmic viscosity number, at 25° C., of 0.134.

ii) Production of Unsaturated Imide Compound (B)

In a 500 ml flask, (a) 128.30 g of methyl-5-norbornene-2,3-dicarboxylic anhydride, (b) 39.66 g of propargyl amine (PA), and (C) 582 g of N-methyl-2-pyrrolidone (NMP) were charged and stirred under a nitrogen gas stream at 50° C. for one hour, to form an amic acid compound, and the reaction solution was then heated to 185° C. and stirred at the same temperature for one hour, to form an unsaturated imide compound.

The resultant reaction solution was cooled to room temperature (about 25° C.) and poured into water, to separate a liquid unsaturated imide compound, distilled to distill off the water, and the residue of the distillation dried under a vacuum, to yield a liquid unsaturated imide compound.

iii) Preparation of Terminal-Modified Imide Oligomer Composition

By dissolving 166 g of the terminal-modified imide oligomer (powder) (A) and 11.4 g of the unsaturated imide compound (liquid) (B) obtained as described above in N,N-dimethyl acetamide (DMAc), a terminal-modified imide oligomer solution containing the terminal-modified imide oligomer (A) and the unsaturated imide compound (B) in a total concentration of 40% by weight having a solution viscosity of 30 cps at 25° C. was prepared.

iv) Production of Prepreg

Under the conditions of a temperature of 25° C. and a humidity of 50% RH, Si-Ti-C-0 type inorganic fibers (produced by Ube Industries, Ltd. and marketed under the trademark of "Tyranno" fibers, 1600 filament) were impregnated with the terminal-modified imide oligomer composition (solution) prepared as described above, taken up on a drum winder, drawn and arranged unidirectionally (UD), and heated at 150° C. for 2.5 hours, to produce a prepreg.

During the production of the prepreg mentioned above, the impregnation of the terminal-modified imide oligomer composition into the web of the inorganic fibers was good.

The prepreg obtained as described above had a volatile matter content of 1% by weight or less and contained substantially no solvent. The resin content was 35.0% by weight and the gel time was 15 minutes.

The test for the tackiness mentioned above showed that the prepreg was as desired.

v) Production of Composite Material (Cured Laminate)

Eight rectangles having 260 mm in length and 90 mm in width were cut from the prepreg mentioned above, stacked unidirectionally (0° direction), under a pressure at 70° C. The resultant laminate was heated to 180° C. in an autoclave, held at that temperature for two hours, then heated to 250° C. and held at that temperature for four hours, cooled to 80° C., and finally the pressure was released, to produce a shaped article of the laminate composite material. During the molding of the composite material, the maximum molding pressure was 8.5 kg/cm$^2$. The interior of the bag was retained under a vacuum (5 mmHg or less) until the inner temperature of the autoclave reached 250° C..

A test piece (85 mm in length and 250.0 mm in width relative to the direction of the fibers) for a bending test and a test piece (12.7 mm in length and 6.35 mm in width relative to the direction of the fibers) for an interlaminar shear test, were cut from the shaped article (composite material) thus obtained. The test pieces were used for testing the flexural strength, flexural modulus, interlaminar shear strength, and volumetric fiber content. The results are shown in Table 1.

A 4-ply 0°-direction laminate sheet was similarly prepared and subjected to post-curing in a non-oxidative atmosphere at 330° C. for 6 hours, to produce a composite material. The Tg of the resultant composite material is shown in Table 1.

EXAMPLE 2

A terminal-modified imide oligomer composition was prepared in th same manner as in Example 1, except that the amount of the unsaturated imide compound used in the preparation of the terminal-modified imide oligomer composition was changed to 22.8 g. A composite material was formed according to the same procedure of Example 1, except that the prepreg used for the composite material was produced by using the composition above-mentioned. The characteristics of the prepreg thus obtained, and the physical properties of the composite material, are shown in Table 1.

EXAMPLE 3

An unsaturated imide compound was produced in the same manner as in Example 1, except that ethyl-5-norbornene-2,3-dicarboxylic anhydride was used instead of methyl-5-norbornene-2,3-dicarboxylic anhydride. A terminal-modified imide oligomer solution was prepared by using this unsaturated imide compound, and a prepreg was produced by using the resultant solution. Then, a composite material was molded in the same manner as in Example 1, except that the prepreg mentioned above was used instead. The characteristics of the prepreg thus obtained, and the physical properties of the composite material, are shown in Table 1.

EXAMPLES 4 to 6

Unsaturated imide compounds (B) were produced in the same manner as in Example 1, except that various monoamine compounds shown in Table 1 were used instead. Terminal-modified imide oligomer compositions were prepared in the same manner as in Example 1, except that these unsaturated imide compounds were used in the amounts indicated in Table 1. Prepregs were produced by using these compositions, and composite materials were molded in the same manner as in Example 1, except that the prepregs mentioned above were used instead. The characteristics of the prepregs thus obtained, and the physical properties of these composite materials, are shown in Table 1.

EXAMPLES 7 and 8

Prepregs were produced in the same manner as in Example 1, except that carbon fibers (produced by Toho Rayon Co., Ltd. and marketed under the trademark of Besfight HTA 3000 Filament") and glass fiber cloth (produced by Nittobo Co., Ltd. and marketed under the trademark of "WR570C-100") were respectively used instead of the Si-Ti-C-0 type inorganic fibers. Composite materials were molded in the same manner as in Example 1, except that the prepregs mentioned above were used instead. The characteristics of the prepregs thus obtained, and the physical properties of these composite materials, are shown in Table 1.

EXAMPLES 9 to 12

Terminal-modified imide oligomer solutions were prepared in the same manner as in Example 1, except that the amount of the unsaturated imide compound used was changed to 85.5 g (Example 9), 67.8 g (Example 10), 115.4 g (Example 11), and 172.8 g (Example 12), the total concentration of the terminal-modified imide oligomer (A) and the unsaturated imide compound (B) in the terminal-modified imide oligomer solution was changed to about 29% by weight, and the solution viscosity thereof was changed to about 23 cps.

Then, using the above-mentioned solutions, prepregs having the characteristics shown in Table 1 (150 μm in thickness) were produced in the same manner as in Example 1, except that the same carbon fibers as used in Example 7 were used as reinforcing fibers.

Composite materials were molded in the same manner as in Example 1, except that the number of prepregs used was 16 and the ply stacking temperature was 100° C. The various physical constants of the composite materials thus obtained are shown in Table 1.

TABLE 1

| Example No. | Unsaturated imide compound (B) Kind | Amount used (g) | Kind of reinforcing fibers | Characteristics of prepreg Volatile matter content (% by weight) | Resin content (% by weight) | Gel time (min) | Test for tackiness A | B | Tg (°C.) |
|---|---|---|---|---|---|---|---|---|---|
| 1 | Reaction product of methyl-5-norbornene-2,3-dicarboxylic anhydride with propargyl amine | 11.4 | Si—Ti—C—O-type inorganic fibers (Tyranno fibers) | Less than 1% | 35 | 15 | Good | — | 300 |
| 2 | Reaction product of methyl-5-norbornene-2,3-dicarboxylic anhydride with propargly amine | 22.7 | Si—Ti—C—O type inorganic fibers (Tyranno fibers) | Less than 1% | 35 | 10 | Good | — | 310 |
| 3 | Reaction product of ethyl-5-norbornene-2,3-dicarboxylic anhydride with propargyl amine | 12.1 | Si—Ti—C—O type inorganic fibers (Tyranno fibers) | Less than 1% | 34 | 15 | Good | — | 302 |
| 4 | Reaction product of methyl-5-norbornene-2,3-dicarboxylic anhydride with diethyl propargyl amine | 14.4 | Si—Ti—C—O type inorganic fibers (Tyranno fibers) | Less than 1% | 36 | 15 | Good | — | 290 |
| 5 | Reaction product of methyl-5-norbornene-2,3-dicarboxylic anhydride with dimethyl propargly amine | 12.9 | Si—Ti—C—O type inorganic fibers (Tyranno fibers) | Less than 1% | 36 | 15 | Good | — | 295 |
| 6 | Reaction product of methyl-5-norbornene-2,3-dicarboxylic anhydride with 3-aminophenyl acetylene | 14.8 | Si—Ti—C—O type inorganic fibers (Tyranno fibers) | Less than 1% | 34 | 15 | Good | — | 308 |
| 7 | Reaction product of methyl-5-norbornene-2,3-dicarboxylic anhydride with propargly amine | 11.4 | Carbon fibers | Less than 1% | 36 | 15 | Good | — | 301 |
| 8 | Reaction product of methyl-5-norbornene-2,3-dicarboxylic anhydride with propargly amine | 11.4 | Glass fibers | Less than 1% | 36 | 15 | Good | — | 302 |
| 9 | Reaction product of methyl-5-norbornene-2,3-dicarboxylic anhydride with propargly amine | 85.5 | Carbon fibers | Less than 1% | 30 | 14 | Good | 70 | 344 |
| 10 | Reaction product of methyl-5-norbornene-2,3-dicarboxylic anhydride with propargly amine | 67.8 | Carbon fibers | Less than 1% | 34 | 18 | Good | 90 | 336 |
| 11 | Reaction product of methyl-5-norbornene-2,3-dicarboxylic anhydride with propargly amine | 115.4 | Carbon fibers | Less than 1% | 34 | 16 | Good | 60 | 354 |
| 12 | Reaction product of methyl-5-norbornene-2,3-dicarboxylic anhydride with propargly amine | 172.8 | Carbon fibers | Less than 1% | 35 | 17 | Good | 51 | 370 |

| Example No. | Properties of composite material Flexural strength (kg/mm$^2$) | Flexural modulus (t/mm$^2$) | Interlaminar shear strength (kg/mm$^2$) | Volume content of fibers (% by volume) |
|---|---|---|---|---|
| 1 | 215 | 10.8 | 10.5 | 63 |
| 2 | 212 | 10.4 | 11.0 | 60 |
| 3 | 210 | 10.7 | 10.1 | 61 |
| 4 | 205 | 10.0 | 9.3 | 61 |
| 5 | 201 | 10.5 | 9.5 | 60 |
| 6 | 199 | 9.9 | 9.1 | 60 |
| 7 | 183 | 14.3 | 10.2 | 60 |
| 8 | 56 | 3.4 | 6.5 | 61 |
| 9 | 248 | 12.3 | 12.1 | 58 |
| 10 | 203 | 12.2 | 12.2 | 59 |
| 11 | 206 | 12.6 | 12.5 | 63 |
| 12 | 199 | 12.3 | 12.1 | 58 |

REFERENCE EXPERIMENT

The prepreg produced in Example 9 was stored at 23° C., and during the course of this storage, was tested for changes in gel time and tackiness with a lapse of time. The results are shown in Table 2.

TABLE 2

| Storage time (days) | Gel time (min.) | Degree of tackiness (g/cm$^2$) |
|---|---|---|
| 0 | 14 | 70 |
| 5 | 13 | 74 |
| 7 | 13 | 74 |
| 13 | 15 | 84 |
| 22 | 15 | 61 |
| 65 | 15 | 77 |
| 117 | 16 | 66 |
| 146 | 16 | 70 |

It is clear from Table 2 that the prepreg of Example 9 had an excellent storage stability.

EXAMPLE 13

A terminal-modified imide oligomer (A) was produced in the same manner as in Example 1, except that 48.06 g of 3,4'-diaminodiphenyl ether and 17.54 g of 1,3-bis(4-aminophenoxy)benzene were used as the components for an aromatic diamine.

A terminal-modified imide oligomer solution in which the total concentration of a terminal-modified imide oligomer (A) and an unsaturated imide compound (B) was 32.5% by weight was prepared by dissolving 178 g of the above-mentioned terminal-modified imide oligomer (A) and 96.75 g of the unsaturated imide compound (B) prepared in Example 1 in N,N-dimethyl acetamide.

A prepreg was produced in the same manner as in Example 1, except that the solution mentioned above was used.

The resultant prepreg had a volatile matter content of not more than 1% by weight and contained substantially no solvent. The resin content, gel time, and tackiness were, respectively, 41.6% by weight, 17 minutes, and 59 g/cm$^2$.

EXAMPLE 14

A terminal-modified imide oligomer (A) was produced in the same manner as in Example 1, except that 64.87 g of 3,3'-diaminodiphenyl sulfone was used.

A terminal-modified imide oligomer solution in which the total concentration of terminal-modified imide oligomer (A) and unsaturated imide compound (B) was 34.5% by weight was prepared by dissolving 177 g of the terminal-modified imide oligomer (A) mentioned above and 96.75 g of the unsaturated imide compound (B) produced in Example 1, in N,N-dimethyl acetamide.

A prepreg was produced in the same manner as in Example 1, except that the solution mentioned above was used.

The resultant prepreg had a volatile matter content of not more than 1% by weight and contained substantially no solvent. The resin content, gel time, and tackiness degree were, respectively, 39.6% by weight, 17 minutes, and 45 g/cm$^2$.

COMPARATIVE EXAMPLE 1

A terminal-modified imide oligomer solution was prepared in the same manner as in Example 1, except that no unsaturated imide compound was used. A prepreg was produced in the same manner as in Example 1, except that the solution mentioned above was used. The prepreg had a gel time of 30 minutes and had no tackiness. A composite material (shaped article) produced by laminating such prepregs and thermally curing the laminated prepregs was unsatisfactory.

COMPARATIVE EXAMPLE 2

A terminal-modified imide oligomer solution was prepared in the same manner as in Example 1, except that the amount of the unsaturated imide compound used for the production of the terminal-modified imide oligomer solution was changed to 3.9 g.

A prepreg was produced in the same manner as in Example 1, except that the terminal-modified imide-oligomer solution mentioned above was used. The prepreg had a gel time of 19 minutes and had no tackiness. A composite material (shaped article) produced by laminating such prepregs and thermally curing the laminated prepregs was unsatisfactory.

COMPARATIVE EXAMPLE 3

An unsaturated imide compound was produced in the same manner as in Example 1, except that allylamine was used instead of propargyl amine. A terminal-modified imide oligomer solution was prepared in the same manner as in Example 1, except that the unsaturated imide compound mentioned above was used.

The production of a prepreg was attempted, in the same manner as in Example 1, except that the terminal-modified imide oligomer solution mentioned above was used. The prepreg produced had no tackiness, because the greater part of the unsaturated imide compound was lost by vaporization during the course of the production thereof. A composite material (shaped article) produced by laminating such prepregs and thermally curing the laminated prepregs was unsatisfactory.

COMPARATIVE EXAMPLE 4

An unsaturated imide compound was produced in the same manner as in Example 1, except that 5-norbornene-2,3-dicarboxylic anhydride was used instead of methyl-5-norbornene-2,3-dicarboxylic anhydride. A terminal-modified imide oligomer solution was prepared in the same manner as in Example 1, except that the unsaturated imide compound mentioned above was used.

A prepreg was produced in the same manner as in Example 1, except that the terminal-modified imide oligomer solution mentioned above was used. The prepreg thus produced had a gel time of 20 minutes and no tackiness. A composite material (shaped article) produced by superposing such prepregs and thermally curing the superposed prepregs was unsatisfactory.

COMPARATIVE EXAMPLE 5

A terminal-modified imide oligomer solution was prepared in the same manner as in Example 1, except that divinyl benzene was used instead of unsaturated imide compound.

A prepreg was produced in the same manner as in Example 1, except that the terminal-modified imide oligomer solution mentioned above was used. The prepreg thus obtained had no tackiness, because the greater part of the divinyl benzene was lost by vaporization. A composite material (i.e., shaped article) produced by laminating such prepregs and thermally curing the laminated prepregs was unsatisfactory.

We claim:

1. A terminal-modified imide oligomer composition comprising:
   (A) 100 parts by weight of a terminal-modified imide oligomer produced by reacting in a solvent, a biphenyltetracarboxylic acid compound with an aromatic diamine compound and a monoamine compound having a carbon-carbon triple bond and having (i) an unsaturated terminal group at the terminal of the oligomer, (ii) an imide bond in the oligomer, and (iii) a logarithmic viscosity number at 30° C., as determined at a concentration of 0.5 g/100 ml of N-methyl-2-pyrrolidone as a solvent, of 0.1 to 1 and;
   (B) 5 to 180 parts by weight of an unsaturated imide compound produced by reacting, in a solvent, a substituent-containing nadic anhydride with a monoamine compound having a carbon-carbon triple bond in an equimolar ratio and having an unsaturated terminal group at the terminal thereof and an imide bond therein.

2. A composition as claimed in claim 1, wherein said terminal-modified imide oligomer (A) has a softening point of 100° C. to 300° C..

3. A composition as claimed in claim 1, wherein said terminal-modified imide oligomer (A) has a logarithmic viscosity number of 0.2 to 0.8.

4. A composition as claimed in claim 1, wherein said biphenyltetracarboxylic acid is at least one compound selected from the group consisting of 3,3',4,4'-biphenyltetracarboxylic acid, 3,3',4,4'-biphenyltetracarboxylic dianhydride (s-BPDA), 2,3,3',4'-biphenyltetracarboxylic acid, 2,3,3',4'-biphenyltetracarboxylic dianhydride (a-BPDA) and lower alcohol esters and salts thereof.

5. A composition as claimed in claim 1, wherein said aromatic diamine compound is at least one compound selected from the group consisting of phenylene diamine type diamine compounds, xylylene type diamine compounds, trialkylbenzene type diamine compounds, benzidine type diamine compounds, diphenyl ether type diamine compounds, diphenyl thioether type diamine compounds, benzophenone type diamine compounds, diphenyl sulfine type diamine compounds, diphenyl sulfide type diamine compounds, diphenyl sulfone type diamine compounds, diphenyl alkane type diamine compounds, bis(phenoxy)benzene type diamine compounds, bis[(phenoxy)phenyl]propane type diamine compounds, and bis(phenoxy)diphenyl sulfone type diamine compounds.

6. A composition as claimed in claim 1, wherein said monoamine compound having a carbon-carbon triple bond to be used in the production of the terminal-modified imide oligomer (A) is at least one compound selected from the group consisting of aliphatic and aromatic monoamine compounds having both a carbon-carbon triple bond and a monoamino group.

7. A composition as claimed in claim 1, wherein said unsaturated imide compound(B) has a logarithmic viscosity number at 30° C., as determined at a concentration of 0.5 g/100 ml of N-methyl-2-pyrrolidone as a solvent, of 0.005 to 0.09.

8. A composition as claimed in claim 1, wherein said monoamine compound having a carbon-carbon triple bond to be used in the production of the unsaturated imide compound (B) is at least one compound selected from the group consisting of aliphatic and aromatic monoamine compounds having both a carbon-carbon triple bond and a monoamino group.

9. A composition as claimed in claim 1, wherein said substituent-containing nadic anhydride is at least one compound selected from the group consisting of nadic anhydrides substituted with an alkyl group having 1 to 6 carbon atoms, an alkoxy group having 1 to 6 carbon atoms, a halogenated hydrocarbon group having 1 to 6 carbon atoms and 1 to 5 halogen atoms, or halogen group positioned at the 5- or 6-position.

10. A composition as claimed in claim 1, wherein said terminal-modified imide oligomer (A) is a powder and said unsaturated imide compound (B) is a liquid.

* * * * *